United States Patent [19]

Lin

[11] Patent Number: 5,795,639
[45] Date of Patent: Aug. 18, 1998

[54] VACUUM INSULATION PANEL HAVING BLENDED WOOL FILLER AND METHOD FOR MANUFACTURING

[75] Inventor: David C. K. Lin, Worthington, Ohio

[73] Assignee: Owens Fiberglas Technology, Inc., Summit, Ill.

[21] Appl. No.: 792,686

[22] Filed: Jan. 29, 1997

Related U.S. Application Data

[62] Division of Ser. No. 462,937, Jun. 5, 1995, abandoned, which is a continuation of Ser. No. 405,129, Mar. 16, 1995.

[51] Int. Cl.$^6$ .................................................. B32B 3/00
[52] U.S. Cl. .................... 428/68; 428/69; 428/70; 52/406.2; 52/407.5
[58] Field of Search .................... 428/60, 69, 70; 52/406.2, 407.5

[56] References Cited

U.S. PATENT DOCUMENTS

| | | |
|---|---|---|
| 2,742,385 | 6/1952 | Bovenkerk . |
| 2,745,173 | 8/1952 | Janos . |
| 2,824,364 | 8/1954 | Bovenkerk . |
| 2,867,035 | 10/1952 | Patterson . |
| 3,179,549 | 4/1965 | Strong et al. . |
| 4,359,496 | 11/1982 | Kratel et al. . |
| 4,444,821 | 4/1984 | Young et al. . |
| 4,476,185 | 10/1984 | Spittle . |
| 4,486,482 | 12/1984 | Ando et al. . |
| 4,656,081 | 4/1987 | Ando et al. . |
| 4,661,390 | 4/1987 | Kelcher, Jr. . |
| 4,669,632 | 6/1987 | Kawasaki et al. . |
| 4,726,974 | 2/1988 | Nowobilski et al. . |
| 5,090,981 | 2/1992 | Rusek, Jr. . |
| 5,094,899 | 3/1992 | Rusek, Jr. . |
| 5,242,633 | 9/1993 | Rook et al. . |
| 5,326,241 | 7/1994 | Rook et al. . |
| 5,330,816 | 7/1994 | Rusek . |

FOREIGN PATENT DOCUMENTS

| | | |
|---|---|---|
| 779722 | 11/1980 | U.S.S.R. . |
| 9212281 | 7/1992 | WIPO . |

*Primary Examiner*—Richard Weisberger
*Attorney, Agent, or Firm*—C. Michael Gegenheimer; Curtis B. Brueske

[57] ABSTRACT

A vacuum insulation panel includes a blended wool media made up of fibers having at least two different average fiber diameters. The blended wool media includes small fibers which improve thermal performance of a vacuum insulation panel and large fibers which improve the mechanical strength of the insulating media and reduce the time required to produce a vacuum within the panel.

20 Claims, 2 Drawing Sheets

VACUUM INSULATION PANEL HAVING BLENDED WOOL FILLER AND METHOD FOR MANUFACTURING

CROSS-REFERENCE TO RELATED APPLICATION

This is a division of U.S. patent application Ser. No. 08/462,937, filed Jun. 5, 1995, now abandoned which was a continuation of U.S. patent application Ser. No. 08/405,129, filed March 16, 1995, pending.

BACKGROUND OF THE INVENTION

The present invention relates in general to insulating panels and, more particularly, to improved vacuum insulation panels having blended wool fillers and methods of making such panels.

Vacuum insulation panels are well known in the art and typically consist of a thermally insulating media which is contained within a sealed enclosure. The enclosure is evacuated to create a vacuum in the enclosure and thereby reduce heat transfer through the panel. These panels are used in many applications including refrigerator walls, oven walls, cryogenic vessels and other devices requiring high levels of thermal insulation.

A wide variety of insulating media have been used in vacuum insulation panels including conventional fiber glass wool and mixtures of conventional fiber glass wool with other materials. It is apparent from the many varieties of vacuum insulation panels which are known in the art that there is an ongoing need for improvements in these panels to advance the art, reduce costs and provide additional varieties which may be preferred for given applications.

SUMMARY OF THE INVENTION

This ongoing need is currently met by the method and apparatus of the present invention wherein vacuum insulation panels include a blended wool media made up of fibers having at least two different average fiber diameters. The blended wool media includes small fibers which improve thermal performance of vacuum insulation panels and large fibers which improve the mechanical strength of the insulating media and reduce the time required to produce a vacuum within the panels.

In accordance with one aspect of the present invention, a vacuum insulation panel comprises a sealed evacuated jacket defining an interior space with an insulating media in the interior space. The insulating media comprises a blended wool media made up of fibers defining at least two different average fiber diameters. Preferably, the jacket is made of metal having a low coefficient of thermal conductivity and low gas permeability; however, the jacket can also be made of organic films, metallized organic films or other appropriate materials.

To improve the thermal performance of the vacuum insulation panel, the overall average diameter of the fibers defining at least two different average fiber diameters is no larger than the average diameter of fibers making up the insulating media of a conventional vacuum insulation panel having a single average fiber diameter. One such conventional insulation panel is disclosed in U.S. Pat. No. 5,330,816 and is made with glass fibers having a diameter ranging between 1 and 25 microns. In the illustrated embodiment, the blended wool media is made up of fibers defining first and second average fiber diameters. To improve the mechanical performance of the vacuum insulation panel, the first average fiber diameter is less than the second average fiber diameter with the weight ratio of fibers of the first diameter to fibers of the second diameter ranging between 1 and 9, preferably between 6 and 9. To ensure that clear channels are formed within the blended wool insulating media thereby improving the pump down time for the vacuum insulation panel, the blended wool media is made up of fibers defining first and second average fiber diameters, the ratio of the second average fiber diameter to the first average fiber diameter being at least 1.1, preferably between 1.5 and 3.0.

In accordance with another aspect of the present invention, a method of making a vacuum insulation panel comprises the steps of: forming a jacket defining an interior space and an opening communicating with the interior space; filling the interior space with a blended wool insulating media made up of fibers defining at least two different average fiber diameters; evacuating the interior space to form a vacuum therein; and, sealing the opening while maintaining the vacuum. The step of forming a jacket defining an interior space may comprise the step of forming the jacket of a metal having a low coefficient of thermal conductivity and low gas permeability.

The method may further comprise the step of forming the blended wool insulating media of fibers having an overall average diameter which is no larger than the average diameter of fibers making up the insulating media of a conventional vacuum insulation panel having a single average fiber diameter. To improve the mechanical performance of the vacuum insulation panel, the method may further comprise the step of forming the blended wool insulating media of fibers defining first and second average fiber diameters, the first average fiber diameter being less than the second average fiber diameter with the weight ratio of fibers of the first diameter to fibers of the second diameter ranging between 1 and 9, preferably between 6 and 9. To ensure that clear channels are formed within the blended wool insulating media thereby improving the pump down time for the vacuum insulation panel, the method may further comprise the step of forming the blended wool insulating media of fibers defining first and second average fiber diameters wherein the ratio of the second average fiber diameter to the first average fiber diameter is at least 1.1, preferably between 1.5 and 3.0.

It is thus an object of the present invention to provide an improved vacuum insulation panel and an improved method for making the panel; to provide an improved vacuum insulation panel and an improved method for making the panel by using a blended wool media in the panel; to provide an improved vacuum insulation panel and an improved method for making the panel by using a blended wool media in the panel wherein the media includes fibers of at least two different diameters which are in a ratio to one another of at least 1.1, preferably between 1.5 and 3.0, if two different diameters are used; and, to provide an improved vacuum insulation panel and an improved method for making the panel by using a blended wool media in the panel wherein the media includes fibers of at least two different diameters provided in a weight ratio between 1 and 9, preferably between 6 and 9, if two different diameters are used.

Other objects and advantages of the invention will be apparent from the following description, the accompanying drawings and the appended claims.

DETAILED DESCRIPTION OF THE INVENTION

The invention will be described with reference to an insulation panel and method of making the insulation panel using glass fibers. It is to be understood, however, that other fibers such as polymeric fibers or mineral fibers made from rock, slag or basalt can be utilized in the invention as well as blends of different types of fibers produced, for example, by mechanical blending of fibers.

Figure 1:
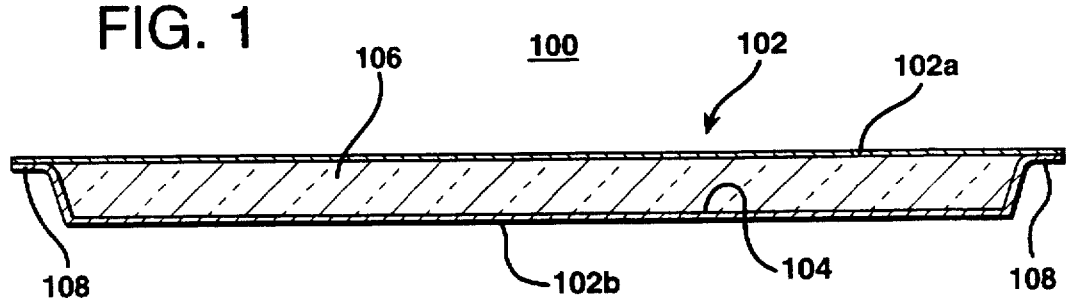
FIG. 1 is a schematic cross sectional view of a vacuum insulation panel in accordance with the present invention.

With reference to FIG. 1, a vacuum insulation panel 100 in accordance with the present invention comprises a jacket 102 including a top 102a and a bottom 102b. Preferably, the jacket 102 is formed of a metal having a low coefficient of thermal conductivity and low gas permeability, for example 3 mil stainless steel. Of course, other jacket materials including organic films and metal coated organic films can be used in the present invention.

As illustrated, the bottom 102b is formed into a pan shape having a cavity 104 for receiving an insulating media 106 and a flat flange 108 extending around its periphery. It is important that the flange 108 be flat, unthinned and wrinkle free to permit a hermetic seal with the top 102a. The top 102a, which is illustrated as being flat but also may be pan shaped or otherwise configured, is welded to the flange 108 to create a hermetic seal either using laser welding or a roll resistance seam welding process.

A number of other vacuum insulation panel structures and methods of making those panels are known in the art and also can be used in the present invention. Additional information regarding vacuum insulation panel structures and their manufacture can be obtained by reviewing U.S. Pat. No. 5,330,816 and U.S. patent application Ser. No. 08/217, 163 which was filed on Jul. 7, 1994, and is entitled VACUUM INSULATION PANEL AND METHOD FOR MANUFACTURING both of which are assigned to the same assignee as the present application and are incorporated herein by reference.

Figure 4:
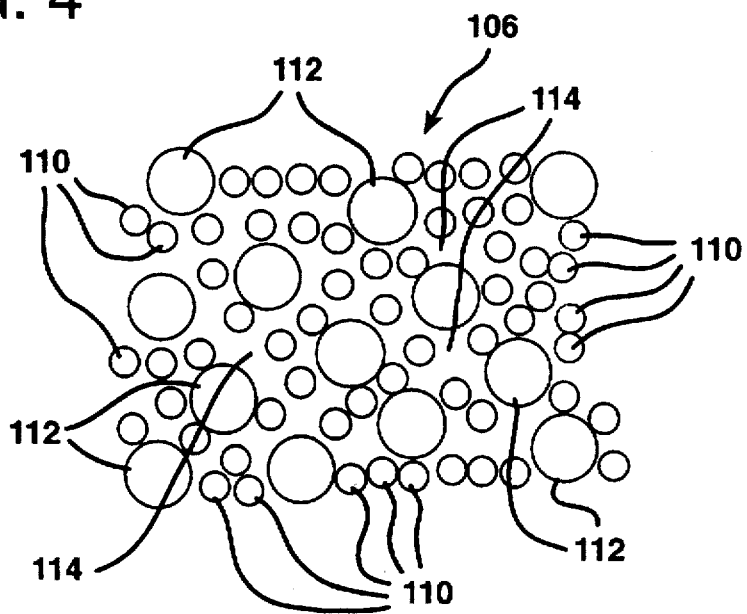
FIG. 4 is an idealized schematic end view of a blended wool media made up of fibers defining two different average fiber diameters for use in the present invention.

In accordance with the illustrated embodiment of the present invention, the insulating media 106 comprises a blended glass wool media made up of fibers defining at least two different average fiber diameters. As illustrated in FIG. 4, the blended glass wool insulating media 106 is made up of glass fibers of two different average fiber diameters, small glass fibers 110 and large glass fibers 112 to enhance the thermal and mechanical performance of the vacuum insulation panel 100 as well as to reduce the cost of manufacturing the vacuum insulation panel 100.

In general, fine fibers improve thermal performance of a vacuum insulation panel at the cost of some loss of mechanical strength. On the other hand, coarse fibers improve the mechanical strength of the insulating media and reduce the time required to "pump down" a vacuum insulating panel, i.e. draw an appropriate vacuum in the cavity 104. The strength attribute is apparent from the larger size of the fibers. With regard to pump down, coarse fibers tend to create larger channels 114 running through the insulating media 106 such that pump down is less restricted and hence can be performed more quickly reducing the time required to produce vacuum insulation panels and hence their cost.

Figure 5:
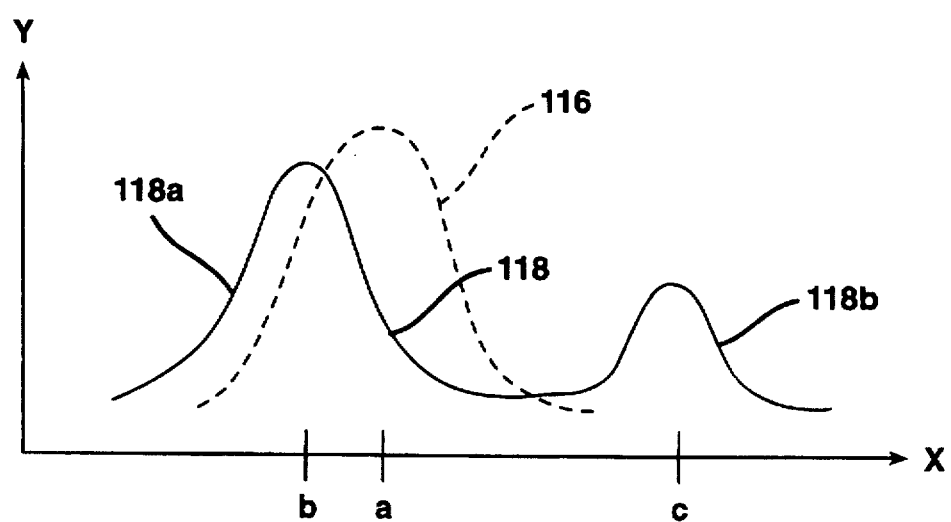
FIG. 5 is a graph representing the distribution of the fiber diameters for a bimodal blended wool media in comparison to a conventional wool media having a single average fiber diameter.

It is preferred to make the overall average diameter of the fibers 110, 112 no larger than the single average diameter of fibers which make up the insulating media of a conventional vacuum insulation panel to improve the thermal performance of the vacuum insulation panel 100. This is illustrated by the graph of FIG. 5 wherein the X axis represents fiber diameter and the y axis represents the number of fibers, and wherein the single average diameter of fibers in a conventional vacuum insulation panel is a with the distribution of fiber sizes being illustrated by the dashed line bell curve 116. The small glass fibers 110 have an average fiber diameter of b with the distribution of small fiber sizes being illustrated by the left bell curve 118a of the solid line curve 118. The large glass fibers 112 have an average fiber diameter of c with the distribution of large fiber sizes being illustrated by the right bell curve 118b of the solid line curve 118. Preferably, the distribution of the fiber sizes of the small glass fibers 110 and the large glass fibers 112 is such that the overall average diameter of the fibers 110, 112 is equal to or less than a.

The weight ratio of the small fibers 110 to the large fibers 112 is between 1 and 9, preferably between 6 and 9, to improve the mechanical performance of the blended glass wool insulating media 106. The ratio of the average fiber diameter c of the large fibers 112 to the average fiber diameter b of the small fibers 110 should be at least 1.1, preferably between 1.5 and 3.0, to ensure that clear channels are formed within the blended glass wool insulating media 106 to improve the pump down time for the vacuum insulation panel 100 including the blended glass wool insulating media 106.

Figure 2:
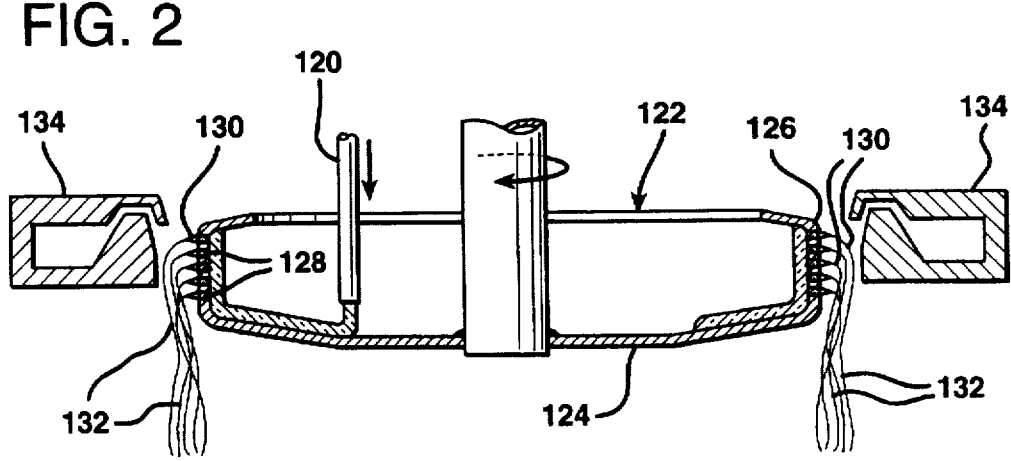
FIG. 2 is a schematic cross sectional view of apparatus for forming a blended wool media made up of fibers defining at least two different average fiber diameters for use in the present invention.
Figure 3:
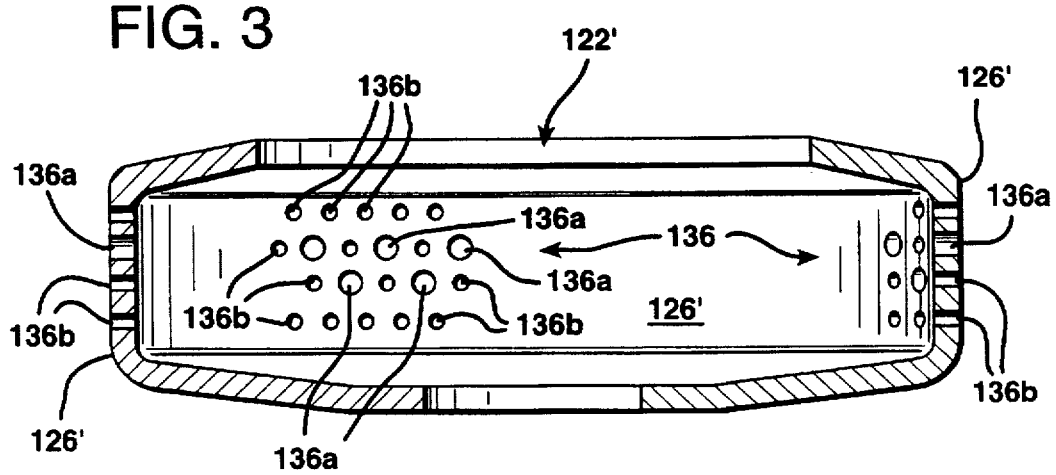
FIG. 3 is a schematic cross sectional view of a rotating spinner for forming a blended wool media made up of fibers defining two different average fiber diameters for use in the present invention.

While the blended glass wool insulating media 106 can be formed in a number of ways including mechanical blending of fibers, it is currently preferred to spin the fibers using the apparatus illustrated in FIGS. 2 and 3. As shown in FIG. 2, molten glass 120 is supplied to a rotating spinner 122. The molten glass 120 impinges on the bottom wall 124 of the spinner 122 and flows outwardly by centrifugal force to the spinner peripheral wall 126 which contains circular orifices 128 through which streams 130 of the molten glass 120 emanate. The relative motion of the streams 130 of molten glass 120 emanating from the spinner 122 and the air surrounding the spinner 122 result in a quenching of the molten streams into glass fibers 132. Other methods of controlling the quench rate include the use of external air sources, baffles or a heat source such as an annular burner, not shown. An annular blower 134 can be positioned concentrically around the spinner 122 to turn the fibers 132 downward for collection of the fibers 132.

A spinner 122' appropriate for formation of an insulating media comprising a blended glass wool media made up of fibers defining at least two different average fiber diameters is illustrated in FIG. 3. In particular, a pattern of holes 136 formed in the peripheral wall 126' of the spinner 122' is designed to generate the desired blended glass wool insulating media 106. As shown in FIG. 3, the pattern of holes 136 comprise large holes 136a for generating the large glass fibers 112 and small holes 136b for generating the small glass fibers 110. Specific hole patterns can be selected to provide a desired blended glass wool media. The hole sizes and number of holes are a function of throughput; fluid viscosity depending on the glass, polymer or mixture being used; the average fiber diameters which are targeted; and, the size of the spinner as will be apparent to those skilled in the art.

The combination of different types of fibers, for example glass fibers and polymeric fibers, can be performed in a number of ways including mechanical blending, providing tandem spinners such that one spinner forms glass fibers and another forms polymeric fibers, and others which will be apparent to those skilled in the art.

Having thus described the invention of the present application in detail and by reference to preferred embodiments thereof, it will be apparent that modifications and variations are possible without departing from the scope of the invention as defined in the appended claims.

I claim:

1. A vacuum insulation panel comprising:
   a sealed evacuated jacket defining an interior space; and
   an insulating media in said interior space comprising a blended wool media made up of fibers defining at least two different average fiber diameters, said fibers having an overall average diameter no larger than the average diameter of fibers making up the insulating media of a conventional vacuum insulation panel.

2. A vacuum insulation panel as claimed in claim 1 wherein said jacket is made of metal.

3. A vacuum insulation panel as claimed in claim 1 wherein said blended wool media is made up of fibers defining first and second average fiber diameters, said first average fiber diameter being less than said second average fiber diameter with the weight ratio of fibers of said first diameter to fibers of said second diameter ranging between 1 and 9.

4. A vacuum insulation panel as claimed in claim 3 wherein the weight ratio of fibers of said first diameter to fibers of said second diameter ranges between 6 and 9.

5. A vacuum insulation panel as claimed in claim 1 wherein said fibers are made from a glass fiber material.

6. A vacuum insulation panel as claimed in claim 1 wherein said fibers are made from a polymeric fiber material.

7. A vacuum insulation panel as claimed in claim 1 wherein said fibers are made from a mineral fiber material.

8. A vacuum insulation panel as claimed in claim 1 wherein said fibers include a combination of fibers made from a polymeric fiber material and fibers made from a glass fiber material.

9. A vacuum insulation panel as claimed in claim 1 wherein said fibers define more than two different average fiber diameters.

10. A vacuum insulation panel comprising:
    a sealed evacuated jacket defining an interior space; and
    an insulating media in said interior space comprising a blended wool media made up of fibers defining at least two different average fiber diameters, said blended wool media being made up of fibers defining first and second average fiber diameters, the ratio of said second average fiber diameter to said first average fiber diameter being at least 1.1.

11. A vacuum insulation panel as claimed in claim 10 wherein the ratio of said second average fiber diameter to said first average fiber diameter ranges between 1.5 and 3.0.

12. A vacuum insulation panel as claimed in claim 10 wherein said jacket is made of metal.

13. A vacuum insulation panel as claimed in claim 10 wherein the overall average diameter of said fibers, defining at least two different average fiber diameters, is no larger than the average diameter of fibers making up the insulating media of a conventional vacuum insulation panel.

14. A vacuum insulation panel as claimed in claim 10 wherein said first average fiber diameter is less than said second average fiber diameter, with the weight ratio of fibers of said first diameter to fibers of said second diameter ranging between 1 and 9.

15. A vacuum insulation panel as claimed in claim 10 wherein the weight ratio of fibers of said first diameter to fibers of said second diameter ranges between 6 and 9.

16. A vacuum insulation panel as claimed in claim 10 wherein said fibers are made from a glass fiber material.

17. A vacuum insulation panel as claimed in claim 10 wherein said fibers are made from a polymeric fiber material.

18. A vacuum insulation panel as claimed in claim 10 wherein said fibers are made from a mineral fiber material.

19. A vacuum insulation-panel as claimed in claim 10 wherein said fibers include a combination of fibers made from a polymeric fiber material and fibers made from a glass fiber.

20. A vacuum insulation panel as claimed in claim 10 wherein said fibers define more than two different average fiber diameters.

* * * * *